United States Patent [19]
Inoue et al.

[11] Patent Number: 5,361,852
[45] Date of Patent: Nov. 8, 1994

[54] SCREWING APPARATUS

[75] Inventors: Hiroyuki Inoue, Uji; Keiji Fujiwara, Hirakata; Tomomi Ogawa, Kofu; Masumi Tezuka, Yamanashi, all of Japan

[73] Assignee: Matsushita Electric Industrial Co., Ltd., Osaka, Japan

[21] Appl. No.: 168,216

[22] Filed: Dec. 17, 1993

[30] Foreign Application Priority Data

Dec. 18, 1992 [JP] Japan .................. 4-338198

[51] Int. Cl.$^5$ ............................................. B25B 23/14
[52] U.S. Cl. ..................................... 173/176; 81/469; 73/862.23
[58] Field of Search ............. 173/2, 4, 5, 6, 176, 173/178, 179, 180; 81/467, 469; 73/862.23

[56] References Cited

U.S. PATENT DOCUMENTS

| | | | |
|---|---|---|---|
| 4,554,980 | 11/1985 | Doniwa | 173/176 |
| 4,562,389 | 12/1985 | Jundt et al. | 81/469 |
| 4,858,312 | 8/1989 | Van Naarden | 81/467 |
| 5,004,054 | 4/1991 | Sheen | 173/178 |
| 5,154,242 | 10/1992 | Sashin et al. | 173/178 |
| 5,203,242 | 4/1993 | Hansson | 81/469 |

*Primary Examiner*—Scott A. Smith
*Attorney, Agent, or Firm*—Wenderoth, Lind & Ponack

[57] ABSTRACT

A screwing apparatus includes a motor for rotating a bit for rotating a screw, a torque detecting device for detecting torque of the bit, and a control device. The control device increases magnitude of fastening torque by applying slight vibration to a torque instruction to be transmitted to the motor after the screw which is to be fastened at a value of target fastening torque is seated on a workpiece, and turns off electric current to be supplied to the motor via the torque instruction when the torque of the bit feedback from the torque detecting device to the control device has attained to the value of the target fastening torque.

5 Claims, 5 Drawing Sheets

SCREWING APPARATUS

BACKGROUND OF THE INVENTION

The present invention relates to a screwing apparatus for screwing parts to each other by means of screws in an assembling process.

There are demands for the development of a screwing apparatus, installed on robots or provided in assembling processes, which can be automatically operated by a rigid quality control procedure. In particular, in torque control in screwing operation, standard fastening torque is provided by the industrial standard, depending on the diameter of a screw and the material of parts to be fastened. In assembling process, it is necessary to examine whether or not parts have been screw-fastened at appropriate fastening torque. But the number of portions to be screw-fastened is so great that it is difficult to inspect all of them. Therefore, sampling inspections are performed to check whether it is possible to tighten screws by means of a torque wrench or a torque driver. In fastening parts with screws at appropriate torque, voltage-driving type drivers or current-driving type drivers are utilized to control the rotational force of a bit installed on a motor so as to fasten parts with screws at appropriate torque.

Referring to FIG. 5, the construction of a conventional screwing apparatus is described below. The screwing apparatus incorporating a brushless motor is provided with a speed reducer 2 at the bottom thereof. The rotational speed of the brushless motor is reduced by the reducer 2 and the reduced speed thereof is transmitted to a bit 3 so as to rotate a screw 10 installed at the lower end of the bit 3. The brushless motor is connected with a current-driving type driver 6 connected with a central processing unit (CPU) 4 via a D/A converter 5. Based on torque set by the CPU 4, the current-driving type driver 6 drives the brushless motor by controlling the intensity of electric current.

The operation of the screwing apparatus having the above-described construction is described below with reference to FIG. 6. The screwing process comprises a screwing region (a) between the start in screwing operation and a seating state (A) in which a seating surface 7a of a screw head 7 is brought into contact with a workpiece 8; and a fastening region (b) between the seating state (A) and the state in which the screw 10 is fastened at target fastening torque (B). In screw-sucking operation to be performed in the screwing region (a), the CPU 4 issues an instruction of a screw-sucking torque value PW1 which means a torque limit set in a low-speed rotation of the brushless motor between the state in which the screw 10 is set on a catcher 9 at a predetermined position thereof and the state in which the screw 10 is sucked by a sucking pipe 11 moved downward to cover the screw head 7 set on the catcher 9. Normally, the screw-sucking torque value PW1 is set to about 2 Kgfcm. A screwing torque value PW2 means a torque limit set in a high-speed rotation of the brushless motor in screwing operation. The screwing torque value PW2 is set to be greater than the target fastening torque (B) in view of the kind of the screw 10 and the workpiece 8 and screwing state so as to prevent the generation of a motor locking error in the screwing operation. A seating torque value PW3 is used between the state in which the screw 10 is positioned at a predetermined height 1 mm above the surface of the workpiece 8 and the state in which the screw 10 is seated on the workpiece 8. That is, the seating torque value PW3 means a torque limit at the time when the seating of the screw 34 on the workpiece 32 is detected. Normally, the seating torque value PW3 is set to be equal to torque, predetermined in the CPU 4, for deciding whether or not the screw 10 has been seated on the workpiece 8. The seating state of the screw 10 is considered in setting the seating torque value PW3. Finally, at a reversing torque value PW4, a reversing brake is operated to seat the screw 10 on the workpiece 8.

At the start in fastening the screw 10 in the fastening region (b), a fastening-start torque value PW5 is used as torque to smoothly fasten the screw 10 seated on the workpiece 8. Normally, the fastening-start torque value PW5 is set to about half as small as the seating torque value PW3. The rate (Kgfcm) of increase in torque from the fastening-start torque value PW5 until the target fastening torque (B) is set per second. For example, supposing that the increase rate of torque is set to 10, torque increases 10 Kgfcm per second. The greater the increase rate of torque is, the shorter fastening period of time is. If the increase rate of torque is too great, fastening torque overshoots, thus exceeding the target fastening torque (B).

In the above construction, during the increase in torque from the screw-sucking torque toward the target fastening torque (B), actual torque does not rise smoothly but rise rapidly due to a change in frictional force (change in dynamic frictional force, static frictional force, and slide) between the screw 10 and the workpiece 8 or a lost motion of a mechanical transmission system comprising the shaft of the motor and the speed reducer 2, even though the CPU 4 issues an instruction so that the torque of the bit 3 increases smoothly. Thus, it is difficult to fasten the screw at the target fastening torque (B). If the torque rises steeply in the vicinity of the target fastening torque (B), the fastening torque may exceed the target fastening torque (B).

SUMMARY OF THE INVENTION

It is accordingly an object of the present invention to provide a screwing apparatus capable of fastening a screw at a predetermined torque value.

In accomplishing these and other objects of the present invention, there is provided a screwing apparatus comprising:

a motor for rotating a bit for rotating a screw;

a torque detecting device for detecting torque of the bit; and a control device for increasing magnitude of fastening torque by applying slight vibration to a torque instruction to be transmitted to the motor after the screw which is to be fastened at a value of target fastening torque is seated on a workpiece, and turning off electric current to be supplied to the motor by means of the torque instruction when the torque of the bit feedback from the torque detecting device to the control device has attained to the value of the target fastening torque.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
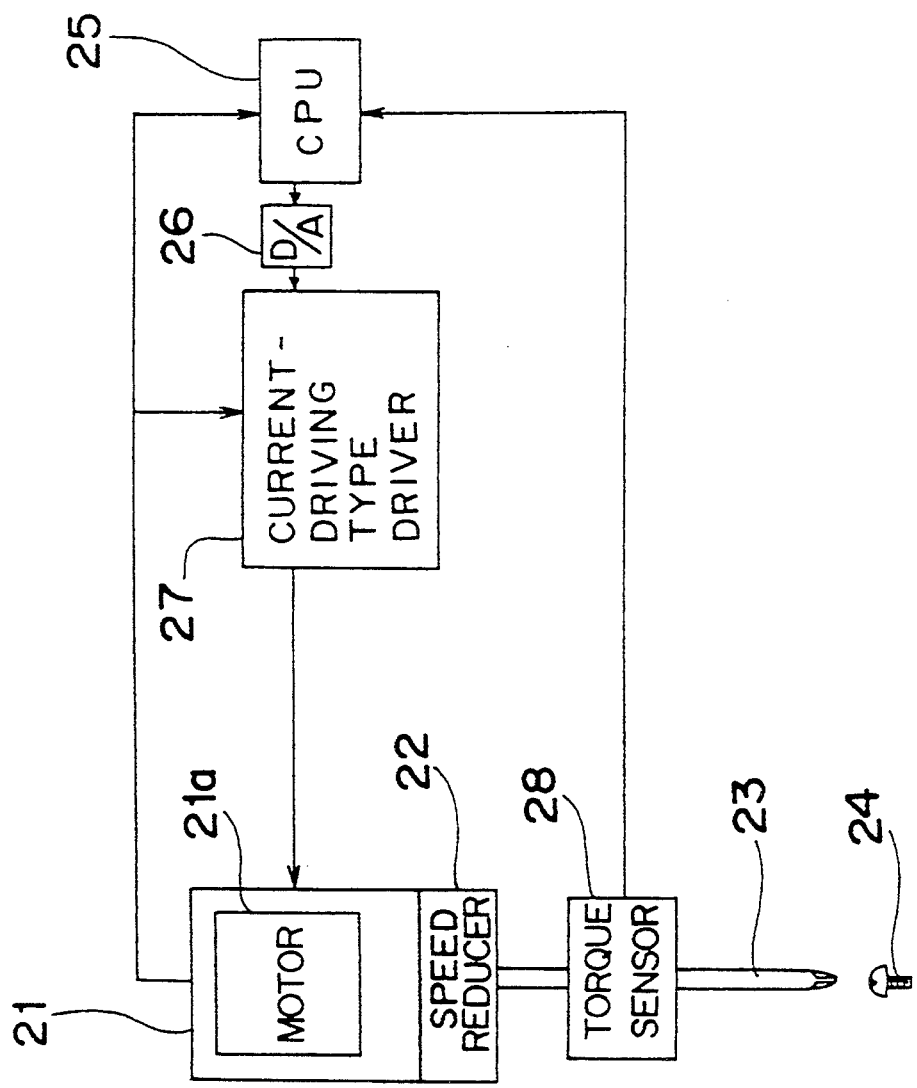
FIG. 1 is a block diagram showing the construction of a screwing apparatus according to an embodiment of the present invention.

Before the description of the present invention proceeds, it is to be noted that like parts are designated by like reference numerals throughout the accompanying drawings.

There is shown in FIG. 1 a screwing apparatus according to an embodiment of the present invention. Referring to FIG. 1, the construction of the screwing apparatus is described below. The main body 21 of the screwing apparatus incorporating a three-phase brushless motor 21a is provided with a speed reducer 2 on the bottom thereof. The rotational speed of the motor 21a is reduced by the reducer 22. The reduced rotational force of the motor 21a is transmitted to a bit 23 so as to rotate a screw 24 installed at the lower end of the bit 23. The motor 21a is connected with a current-driving type driver 27 connected with a central processing unit (CPU) 25 via a D/A converter 26. The current-driving type driver 27 drives the motor 21a depending on the intensity of electric current (torque) instructed by the CPU 25. The motor 21a of the main body 21 of the screwing apparatus is provided with commutation sensors CS1, CS2, and CS3 disposed in the periphery thereof at 120° intervals so as to switch current directions. The sensors CS1 through CS3 are connected with the CPU 25 and the current-driving type driver 27 and switch the direction of electric current to be applied to the motor 21a. Commutation signals outputted from the sensors CS1 through CS3 as three-phase signals of the motor 21a are transmitted to the CPU 25 and the current-driving type driver 27. Based on the levels of the commutation signals, the CPU 25 detects a rotational angle corresponding to the split of one cycle into six equal parts and also detects the rotational speed of the bit 23 by calculating the transition period of time of each commutation signal corresponding to the split of one cycle into six equal parts, as will be described later. In this manner, the CPU 25 controls the rotational speed of the motor 21a, namely, the rotational speed of the bit 23 via the D/A converter 26 and the current-driving type driver 27. The bit 23 is provided with a torque sensor 28 for detecting the rotational torque of the bit 23. The torque sensor 28 is connected with the CPU 25 to send the tongue of the bit 23 thereto. The CPU 25 issues an instruction to the current-driving type driver 27 to stop supply electric current to the motor 21a when the actual torque of the bit 23 detected by the torque sensor 28 has attained to a target fastening torque value. In order to make uniform a frictional force between the screw 34 and a workpiece 32, the CPU 25 applies, to the torque instruction indicating a gradual increase in screwing operation, a square wave of slight vibration, the frequency of which is higher than a response frequency of a mechanical system of the screwing apparatus and lower than a response frequency of a torque detecting system of the screwing apparatus. For example, the frequency of the vibration is twice as great as the response frequency of the mechanical system of the screwing apparatus and its value is 10% of a set torque value. On more detail example, the response frequencies of the mechanical and torque detecting systems are 250 Hz and 1 KHz, while the frequency of the vibration is 500 Hz. The slight vibration is generated by a square wave having a constant cycle. The peak value of the slight vibration is changed according to the magnitude of the target fastening torque (B). That is, when the target fastening torque (B) is small, the peak value of the slight vibration is reduced.

Figure 7:
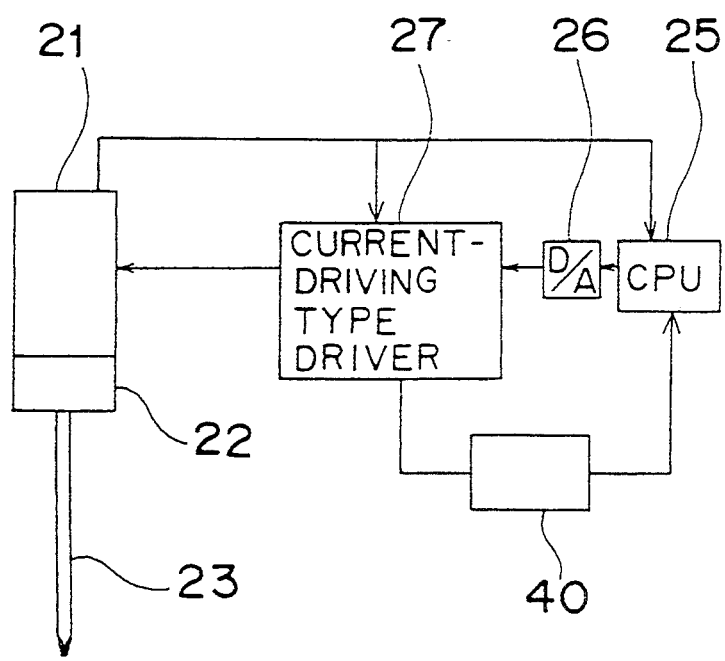
FIG. 7 is a block diagram showing the construction of a screwing apparatus according to another embodiment of the present invention.
Figure 6:
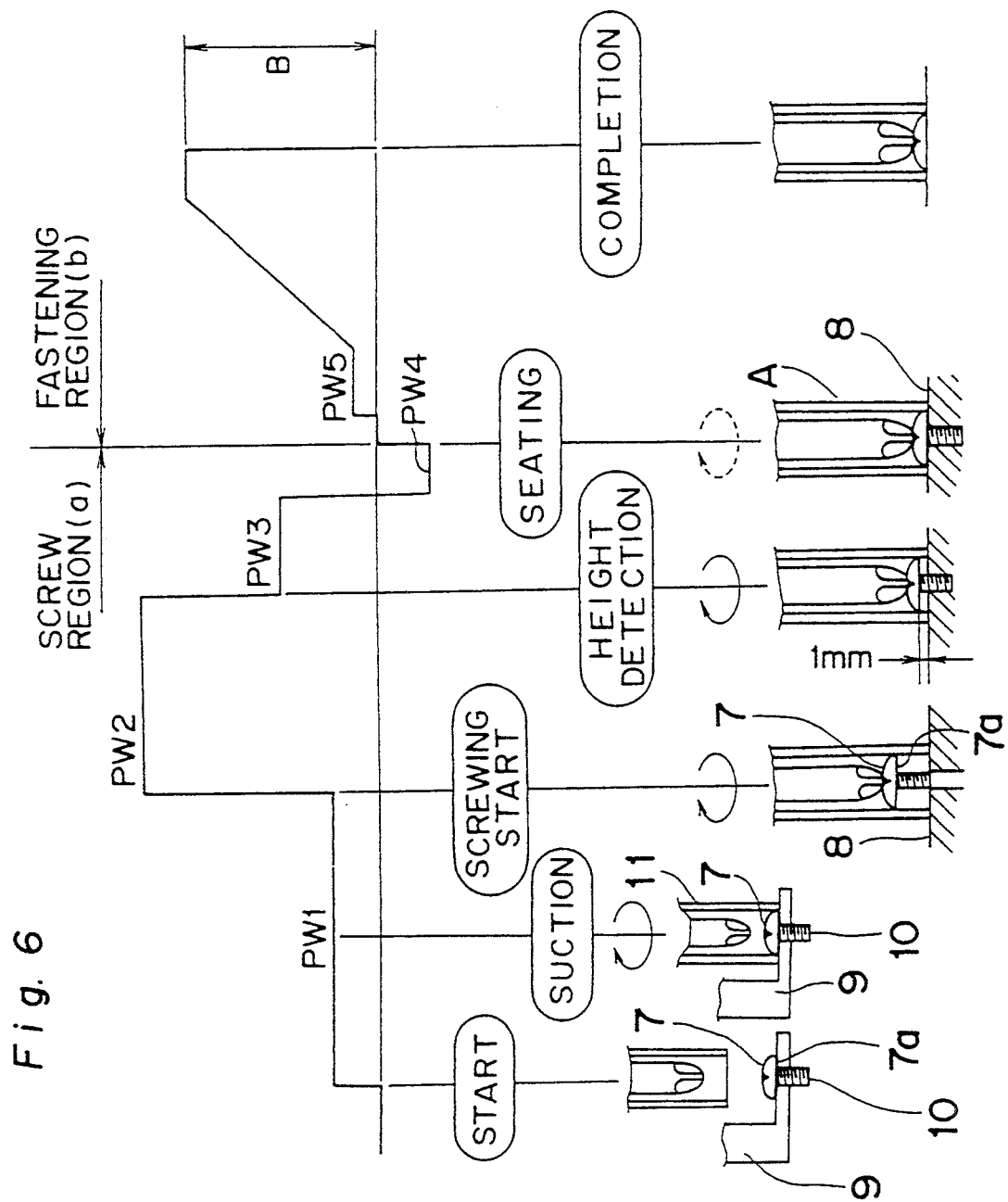
FIG. 6 is a view showing a screwing process of one cycle to be carried out by the screwing apparatus shown in FIG. 5.

Instead of the torque sensor 28, an electric current detecting device 40 can be provided for detecting an electric current value of the multi-phase motor 21a to obtain the torque value of the bit 23, as shown in FIG. 7. That is, the detected current value is supposed as a torque value of the multi-phase motor 21a to be used.

The operation of the screwing apparatus having the above-described construction is described below.

Figure 2:
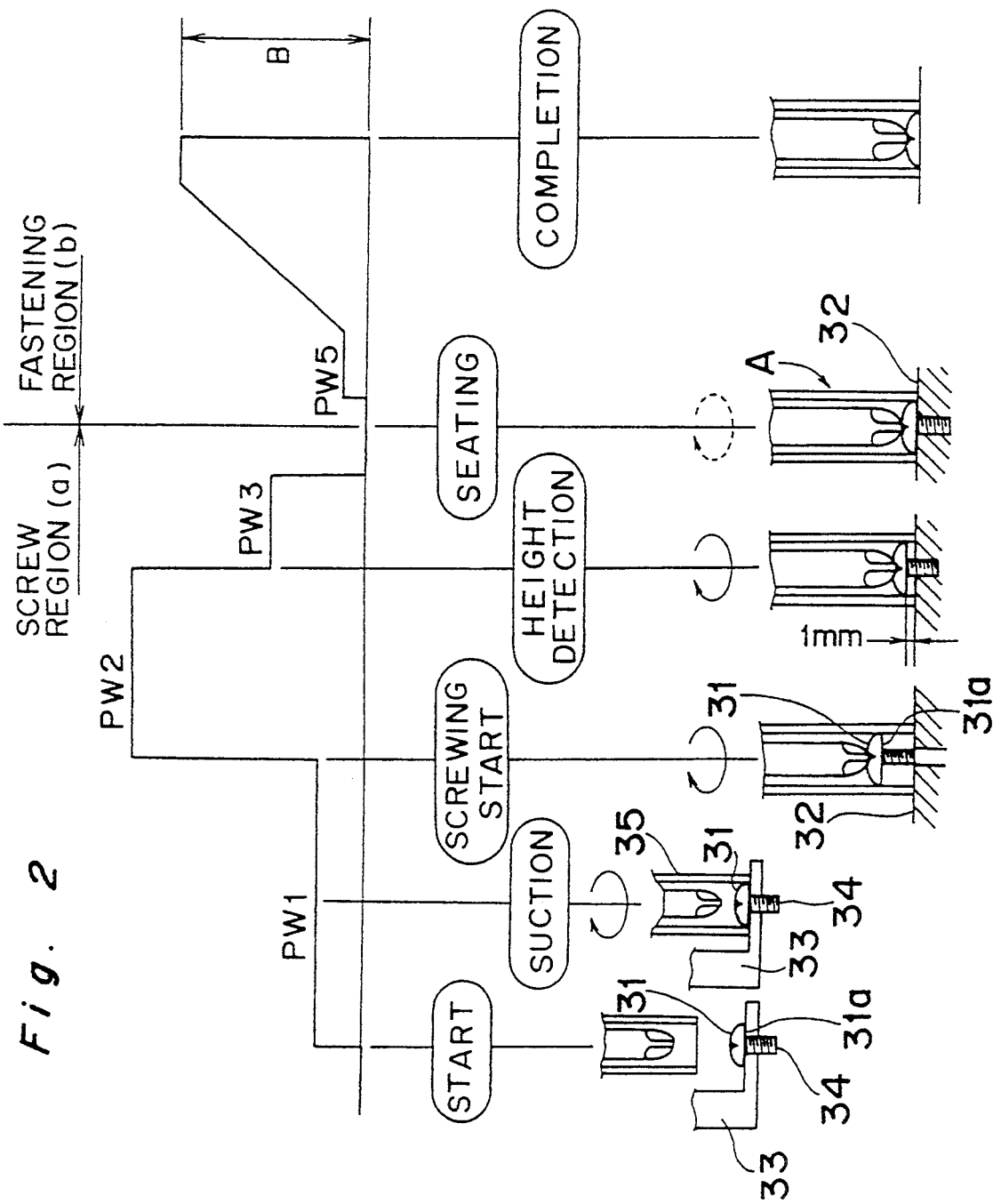
FIG. 2 is a view showing a screwing process of one cycle to be carried out by the screwing apparatus shown in FIG. 1.

FIG. 2 shows the screwing process of one cycle to be performed by the screwing apparatus shown in FIG. 1. The screwing process comprises a screwing region (a) between the start in screwing operation and a seating state (A) in which a seating surface 31a of a screw head 31 is brought into contact with a workpiece 32; and a fastening region (b) between the seating state (A) and the state in which the screw 34 is fastened at target fastening torque (B). In screw-sucking operation to be performed in the screwing region (a), the CPU 25 sets and issues a screw-sucking rotational torque value PW1 as an instruction which means a torque limit set in a low-speed rotation of the motor 21a between the screwing-start state in which the screw 34 is set on a catcher 33 at a predetermined position thereof and the state in which the screw 34 is sucked by a sucking pipe 35 moved downward to cover the screw head 31 set on the catcher 33. Normally, the screw-sucking torque value PW1 is set to about 2 Kgfcm. In the screw-sucking time, the rotational speed of the bit 23 means a speed in a low-speed rotation of the motor 21a between the screwing-start state and the screw sucking state and can be set in a range of from 10%-100% of the maximum speed thereof. Normally, the rotational speed of the bit 23 is set to about 15% of the maximum speed thereof. A screwing rotational torque value PW2 means a torque limit set in a high-speed rotation of the motor 21a in screwing operation. Normally, the screwing rotational torque value PW2 is set to be greater than the target fastening torque (B) in view of the kind of the screw 34 and the workpiece 32 and screwing state so as to prevent the generation of a motor locking error in the screwing operation. At this time, the screwing rotational torque value PW2 is used, the rotational speed of the bit 23 means a speed in a high-speed rotation of the motor 21a in the screwing state and can be set in a range of from 10%–100% of the maximum speed thereof. Normally, the rotational speed of the bit 23 is set to about 80%–100% of the maximum speed thereof in consideration of the seating state of the screw 34 so as to reduce the screwing time period. A seating torque value PW3 is used between the state in which the screw 34 is disposed at a predetermined height 1 mm above the surface of the workpiece 32 and the state in which the screw 34 is seated on the workpiece 32. That is, the seating torque value PW3 means a torque limit at the time when the seating of the screw 34 on the workpiece 32 is detected. The seating torque value PW3 can be set up to 22 Kgfcm. Normally, the seating torque value PW3 is set to be equal to seating decision torque, predetermined in the CPU 25, for deciding whether or not the screw 34 has been seated on the workpiece 32. The seating state of the screw 10 is considered in setting the seating torque value PW3. When the bit 23 is rotated at the seating torque value PW3, at this time, the rotational speed thereof means a rotational speed in seating the screw onto the workpiece, and can be set in a range of from 10%–100% of the maximum speed thereof. Normally, the rotational speed of the bit 23 is set to about 15% of the maximum speed thereof in consideration of the seating state of the screw 34 so as to reduce impact force generated when the screw 34 is seated on the workpiece 32. In this manner, the torque of the bit 23 in seating does not greatly exceed the seating decision torque, predetermined in the CPU 25, for deciding whether or not the screw 34 has been seated on the workpiece 32. When the torque of the bit 23 at the time of seating becomes equal to the torque predetermined in the CPU 25, the seating of the screw 34 on the workpiece 32 is detected and then the supply of electric current to the motor 21a is turned off.

At the start in fastening the screw 34 in the fastening region (b), a fastening-start torque value PW5 is used as torque to smoothly fasten the screw 34 seated on the workpiece 32. The fastening-start torque value PW5 can be set up to 22 Kgfcm. Normally, the fastening-start torque value PW5 is set to about half as small as the seating decision torque. The rate (Kgfcm) of increase in torque from the fastening-start torque value PW5 to the target fastening torque (B) is set per second. For example, supposing that the increase rate of torque is set to 10, torque increases 10 Kgfcm per second. The greater the increase rate of torque is, the shorter fastening period of time is. If the increase rate of torque is too great, fastening torque overshoots, thus exceeding the target fastening torque (B).

In order to make uniform the frictional force between the screw 34 and the workpiece 32, the CPU 25 applies, to the torque instruction indicating the gradual increase in screwing operation, the square wave of slight vibration, for example, the frequency of which is twice as great as the response frequency of the mechanical system of the screwing apparatus and the value of which is 10% of the set torque value. As a result, a sudden rise of torque can be prevented due to a reduced change in the frictional force between the screw 34 and the workpiece 32 or the reduction of lost motions of a transmission system comprising the shaft of the motor 21a and the speed reducer 22. Thus, the torque according to the instruction indicating the gradual increase rises smoothly. Based on the actual torque fed back to the CPU 25 from the torque sensor 28, the CPU 25 controls the gradual increase torque so that the torque becomes a set value, and issues an instruction to stop the supply of electric current from the current-driving type driver 27 to the motor 21a when the actual torque fed back from the torque sensor 28 has attained to a value of target fastening torque (B). According to the above construction, the bit 23 can be certainly stopped at the value of the target fastening torque (B) and thus it can prevent the torque of the bit 23 from exceeding the value of the target fastening torque (B) by steeply rising the torque in the vicinity of the value of the target fastening torque (B).

Comparison is made below between the case in which slight vibration is applied to the instruction torque and the case in which slight vibration is not applied thereto.

Figure 3:
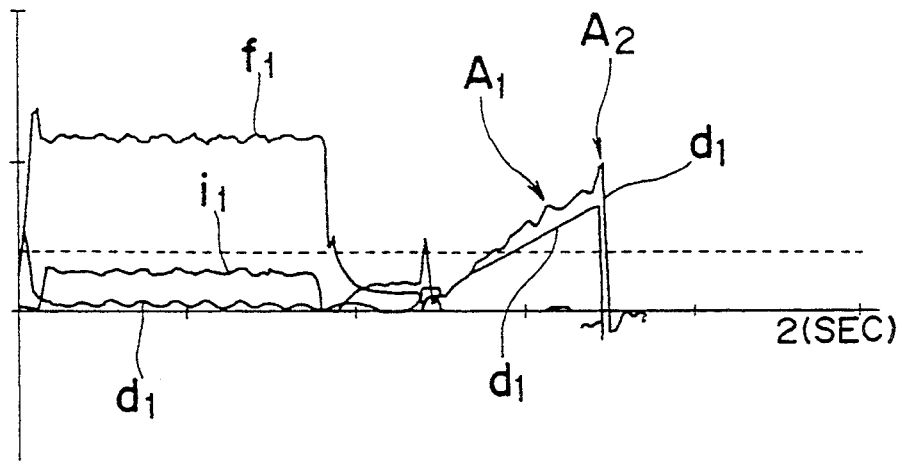
FIG. 3 is a waveform diagram showing the rotational speed and the torque value of a bit, with respect to an instructed intensity of electric current, observed when slight vibration is not applied to an instruction torque value in the screwing apparatus shown in FIG. 1.
Figure 4:
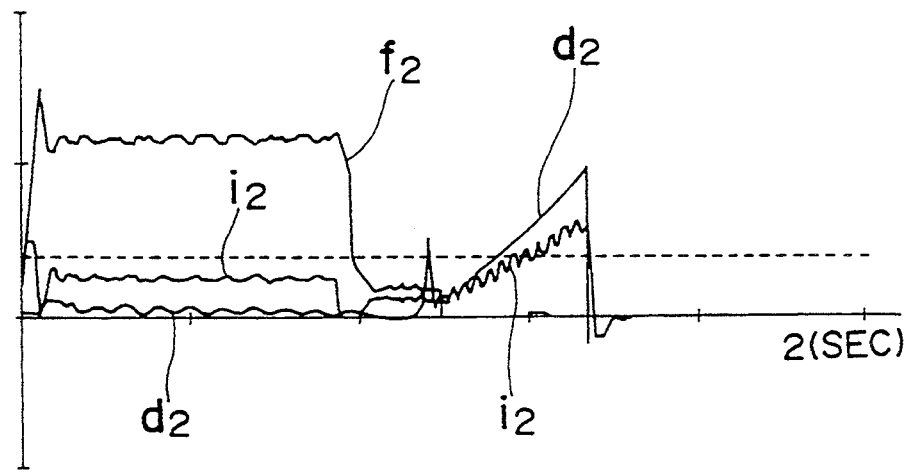
FIG. 4 is a waveform diagram showing the rotational speed and the torque value of the bit, with respect to an instructed intensity of electric current, observed when slight vibration is applied to the instruction torque in the screwing apparatus shown in FIG. 1.
Figure 5:
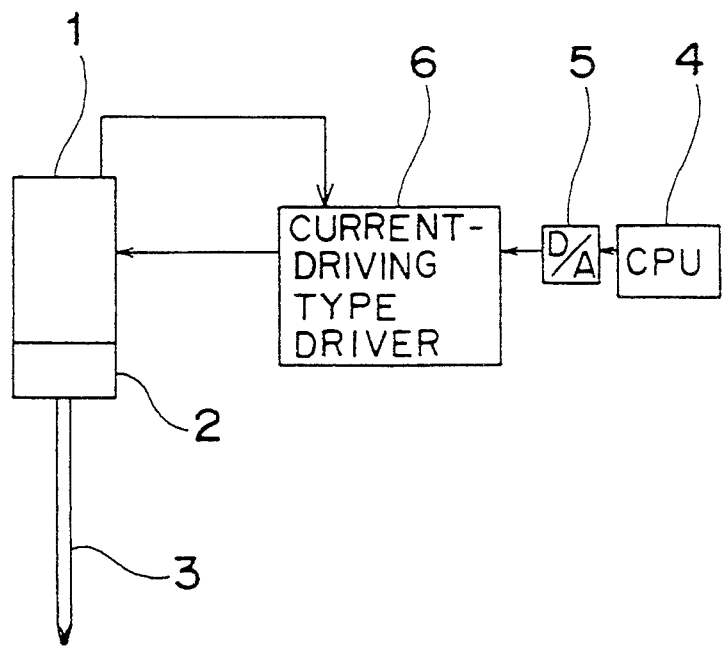
FIG. 5 is a block diagram showing the construction of a conventional screwing apparatus.

FIG. 3 shows the waveform of the rotational speed of the bit and the torque thereof, with respect to an instructed intensity of electric current, observed when slight vibration is not applied to the instruction torque in the screwing apparatus shown in FIG. 1. FIG. 4 shows the waveform of the rotational speed of the bit and the torque thereof, with respect to the instructed intensity of electric current, observed when slight vibration is applied to the instruction torque in the screwing apparatus shown in FIG. 1. Referring to FIGS. 3 and 4, actual rotational speeds f1 and f2 and actual torque values d1 and d2 of the bit are obtained based on each of electric current instructions i1 and i2 issued by the CPU 25 to the motor 21a via the current-driving type driver 27. When slight vibration is not applied to the electric current instruction (torque instruction) i1, abrupt rises A1 and A2 are generated in the actual torque value d1 fed back from the torque sensor 28 to the CPU 25, as shown in FIG. 3. Therefore, even though the CPU 25 detects the target fastening torque (B) via the torque sensor 28 and issues an instruction to stop the supply of electric current to the motor 21a, the actual torque value d1 exceeds the target fastening torque (B), because of the abrupt rise A2 which occurs in the vicinity of the target fastening torque (B). When slight vibration is applied to the electric current instruction (torque instruction) i2, the torque value d2 fed back from the torque sensor 28 to the CPU 25 smoothly rises, as shown in FIG. 4. When the CPU 25 detects the target fastening torque (B) via the torque sensor 28, the CPU 25 issues an instruction to stop the supply of electric current to the motor 21a with the bit rotating at the target fastening torque (B). In this manner, the screw can be fastened at the predetermined fastening torque.

In the embodiment, the CPU 25 applies, to the torque instruction indicating a gradual increase in screwing operation, the square wave of slight vibration, the frequency of which is twice as great as the response frequency of the mechanical system of the screwing apparatus and the value of which is 10% of the set torque value. But it is possible for the torque instruction to include various kinds of slight vibration appropriately set according to the kind of the screw or the workpiece. Furthermore, the vibration can be continuously applied to the current instruction from immediately after seating to completing the fastening operation. Alternatively, the vibration can be applied to the current instruction only before completing the fastening operation.

According to the above construction, the control device increases the magnitude of fastening torque by applying slight vibration to a torque instruction to be transmitted to the motor after the screw which is to be fastened at a target fastening torque value is seated on a workpiece; and turns off electric current to be supplied to the motor by means of the torque instruction when the torque of the bit fed back from the torque sensor to the control means has attained to the target fastening torque value. Therefore, a sudden rise of torque due to a change in frictional force between the screw and the workpiece or a lost motion of a transmission system can be prevented. Thus, fastening torque increases smoothly to the target fastening torque. When the torque of the bit has attained the target fastening torque, the supply of electric current to the motor can be stopped accurately. Therefore, unlike the conventional art, the torque of the bit does not rise abruptly beyond the target fastening torque.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:
1. A screwing apparatus comprising:
a motor for rotating a bit for rotating a screw;
a torque detecting device for detecting torque of the bit; and
a control device for increasing magnitude of fastening torque by applying slight vibration to a torque instruction to be transmitted to the motor after the screw which is to be fastened at a value of target fastening torque is seated on a workpiece, and turning off electric current to be supplied to the motor by means of the torque instruction when the torque of the bit feedback from the torque detecting device to the control device has attained to the value of the target fastening torque.

2. The screwing apparatus as claimed in claim 1, wherein the slight vibration has frequency which is higher than a response frequency of a mechanical system of the screwing apparatus and lower than a response frequency of a torque detecting system of the screwing apparatus.

3. The screwing apparatus as claimed in claim 2, wherein the slight vibration has a square wave and the frequency of the vibration is twice as great as the response frequency of the mechanical system of the screwing apparatus and its value is 10% of a set torque value.

4. The screwing apparatus as claimed in claim 1, wherein the torque detecting device is a torque sensor.

5. The screwing apparatus as claimed in claim 1, wherein the torque detecting device is an electric current detecting device for detecting an electric current value of the multi-phase motor to obtain the torque value of the bit.

* * * * *